United States Patent [19]
Fan

[11] Patent Number: 6,106,743
[45] Date of Patent: Aug. 22, 2000

[54] STRUCTURALLY ORDERED ARTICLES, FABRICATION METHOD AND APPLICATIONS OF THE SAME

[76] Inventor: Bunsen Fan, 2529 Maple Ave., Peekskill, N.Y. 10566

[21] Appl. No.: 09/151,909

[22] Filed: Sep. 11, 1998

[51] Int. Cl.[7] .......................... C09K 19/52; C09K 19/00; F21V 9/00
[52] U.S. Cl. ...................... 252/582; 252/299.01; 428/1.1
[58] Field of Search ............................. 252/299.01, 582; 428/1.1

[56] References Cited

U.S. PATENT DOCUMENTS

| | | | |
|---|---|---|---|
| 5,353,247 | 10/1994 | Faris . | |
| 5,691,789 | 11/1997 | Li et al. . | |
| 5,731,861 | 3/1998 | Hatano et al. | 349/169 |
| 5,737,044 | 4/1998 | Van Haaren et al. | 349/61 |
| 5,793,456 | 8/1998 | Broer et al. | 349/98 |
| 5,796,454 | 8/1998 | Ma | 349/98 |
| 5,858,268 | 6/1999 | Niiyama et al. | 252/299.01 |
| 5,891,357 | 4/1999 | Akashi et al. | 252/299.01 |

FOREIGN PATENT DOCUMENTS

| | | |
|---|---|---|
| 9-318807 | 12/1997 | Japan . |
| WO 97/32224 | 9/1997 | WIPO . |

OTHER PUBLICATIONS

De Gennes, P.G. and Prost, J., *The Physics of Liquid Crystals*, (2nd ed.), pp. 1–3, Clarendon Press, Oxford (1993).

Hikmet, R.A.M. and Zwerver, B.H. [Cholesteric gels formed by LC molecules and their use in optical storage,] *Liquid Crystals*, 13, 561(1993), pp. 561–570.

*Primary Examiner*—C. H. Kelly
*Attorney, Agent, or Firm*—Sampson & Associates

[57] ABSTRACT

A structure and apparatus is described which utilizes the intrinsic self-assembling or aligning process of liquid crystal (LC) molecules to form an ordered structure, such as a structure having nematic or cholesteric ordering. The invention includes subtracting a constituent from a structure that includes a liquid crystal, to form a 'mold' or polymer matrix on a molecular level. By adding and/or subtracting materials to or from the mold, a liquid crystal-like structure may be obtained. This structure includes all or at least some non-LC material, while exhibiting some LC characteristic. The liquid crystal-like structure overcomes the drawbacks of LCs such as temperature sensitivity and mechanical instability.

37 Claims, 11 Drawing Sheets

STRUCTURALLY ORDERED ARTICLES, FABRICATION METHOD AND APPLICATIONS OF THE SAME

BACKGROUND OF INVENTION

1. Field of Invention

The present invention relates to structurally ordered films and more particularly to ordered films employing a novel preparation process for optics applications.

2. Background Information

Throughout this application, various publications and patents are referred to by an identifying citation. The disclosures of the publications and patents referenced in this application are hereby incorporated by reference into the present disclosure.

Liquid crystals exist in a phase intermediate between a crystalline solid and an isotropic liquid. The molecules of these compounds are usually rod-shaped with long molecular axes called the directors. Liquid crystal phases are characterized by the long-range order (i.e. in the sense of a solid) of the molecules. The nematic phase is the simplest, having only orientational ordering such that their directors are approximately parallel. The cholesteric liquid crystal phase originates from the presence of chirality in the nematic phase. Liquid crystals have many applications. They are used as displays in digital wristwatches, calculators, panel meters, thermometers, computer displays and industrial products. They may be used to record, store, and display images which may be projected onto a large screen. They also have potential use as television displays. Moreover, films may be prepared from liquid crystals, in which the molecular ordering is frozen, i.e. by polymerization, to provide desired optical properties. For example, nematic and cholesteric (chiral nematic) films may be prepared to exhibit wavelength- and circular-polarization-selective reflectance/transmission (for cholesteric liquid crystal (CLC) films), and phase-shift transmission (for nematic liquid crystal (NLC) films). A drawback of many of these devices, however, is that without further processing, liquid crystal materials tend to be relatively expensive and relatively temperature sensitive. Also, these materials tend to disadvantageously absorb other materials, which may alter the properties of the component, etc. Moreover, while polymerized LC's may address some of these drawbacks, such LC's may be undesirable for many applications, due to, for example, inadequate mechanical properties (rigidity) and/or optical properties, (indices of refraction, characteristic wavelengths, etc.).

A need thus exists for an improved optical device that exhibits the long-range ordering of liquid crystals while overcoming the aforementioned drawbacks of liquid crystal devices.

SUMMARY OF THE INVENTION

According to one aspect of the present invention, an ordered optical film structure is fabricated by the steps of:

(a) providing a first material and a second material which are substantially non-reactive relative to one another, at least one of the first material and the second material being a liquid crystal;

(b) combining the first material with the second material to form a blend;

(c) forming a film with the blend, the film having a molecular ordering defined by the liquid crystal;

(d) freezing the molecular ordering of the film;

(e) removing one of the first material and the second material to form a matrix having a plurality of sites interspersed therethrough and a liquid crystal-like molecular ordering; and (f) introducing a third material to the plurality of sites.

In a second aspect of the present invention, an ordered optical film structure comprises a substrate and a material disposed on the substrate, the material being a non-liquid crystal having a liquid crystal-like molecular ordering.

In a third aspect of the present invention, an ordered optical film structure is fabricated by the steps of:

(a) providing a liquid crystal and a non-liquid crystal which are substantially non-reactive relative to one another;

(b) combining the liquid crystal with the non-liquid crystal to form a blend;

(c) forming a film with the blend, the film having a molecular ordering defined by the liquid crystal;

(d) freezing the molecular ordering of the film;

(e) removing one of the liquid crystal and the non-liquid crystal to form a matrix having a plurality of sites interspersed therethrough and a liquid crystal-like molecular ordering.

The above and other features and advantages of this invention will be more readily apparent from a reading of the following detailed description of various aspects of the invention taken in conjunction with the accompanying drawings.

DETAILED DESCRIPTION OF THE ILLUSTRATIVE EMBODIMENTS OF THE PRESENT INVENTION

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Figure 1:
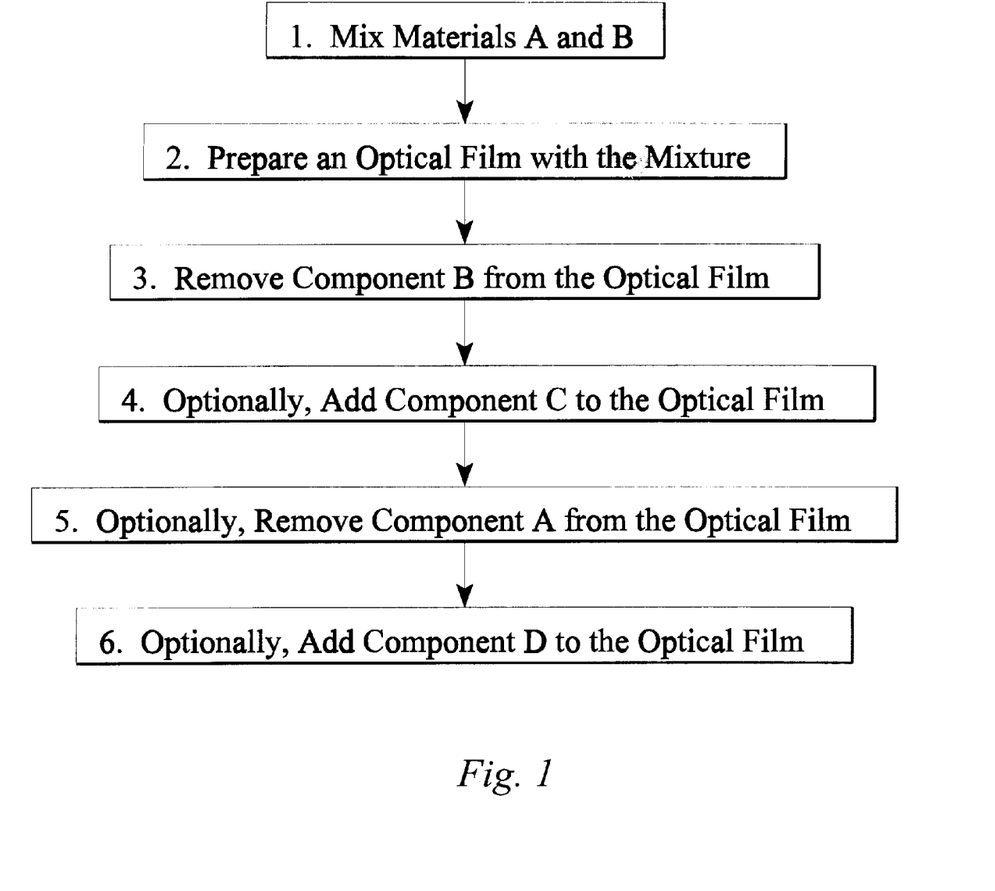
FIG. 1 is a preferred embodiment of steps for preparing optical films of the present invention.
Figure 2A:
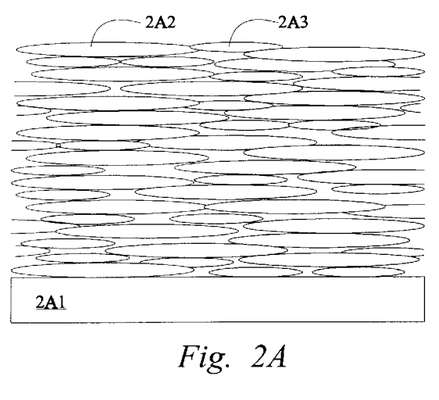
FIG. 2A is a cross-sectional schematic view (across the film thickness) of a structure of an aligned nematic film blend of materials A and B fabricated according to the steps of FIG. 1.
Figure 2B:
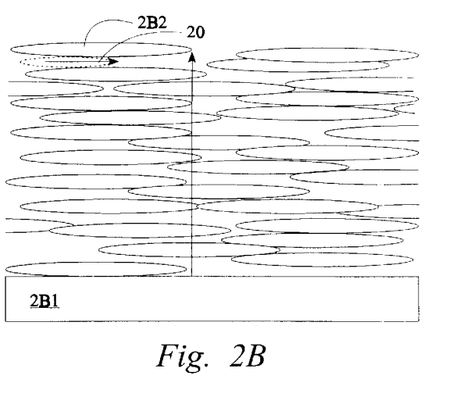
FIG. 2B is the same cross-sectional view illustrating schematically the structure for the film shown in FIG. 2A, after the material B is selectively removed, leaving only material A.
Figure 2C:
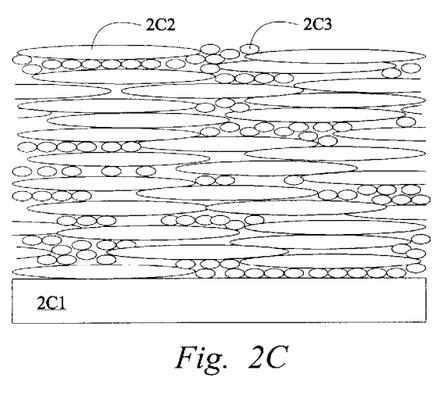
FIG. 2C shows the same cross-sectional view illustrating schematically the structure for the film shown in FIG. 2B, after a material C is added by filling the void left by the material B.
Figure 2D:
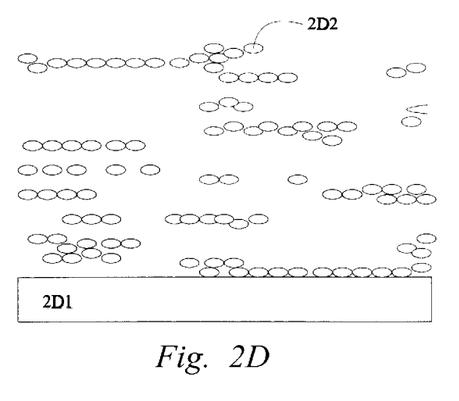
FIG. 2D shows the same cross-sectional view illustrating schematically the structure for the film shown in FIG. 2C, after the material A is selectively removed, leaving only material C.
Figure 2E:
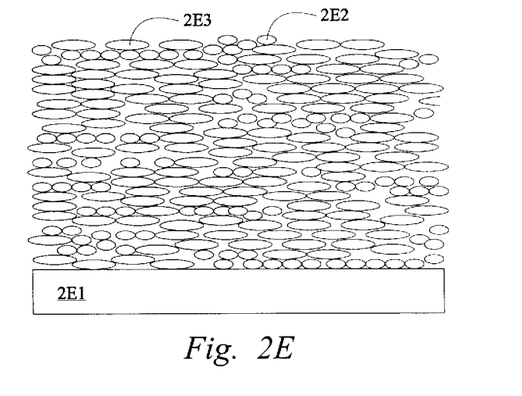
FIG. 2E shows the same cross-sectional view illustrating schematically the structure for the film shown in FIG. 2C, after a material D is added by filling the void left by the material A.
Figure 3:
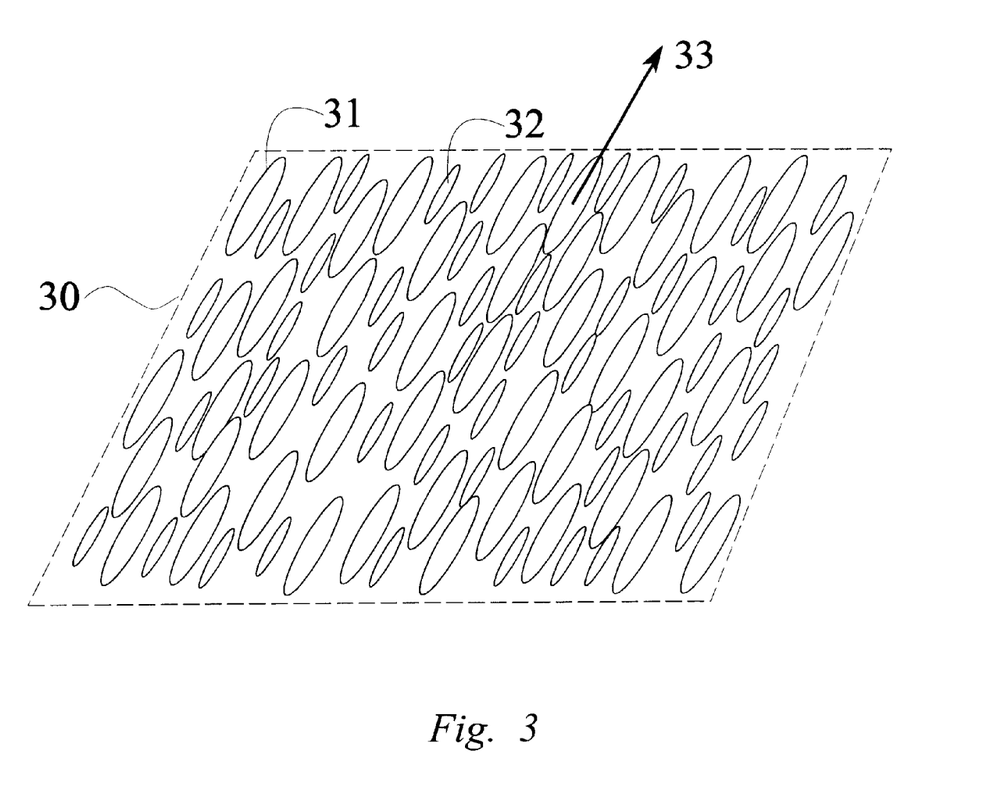
FIG. 3 shows a top view of a layer of aligned nematic film schematically showing component molecules aligned in one direction.

Referring to FIGS. 1–3, the present invention relates to film processing techniques. By utilizing the intrinsic 'self-assembling' or aligning process of liquid crystal (LC) molecules, an 'ordered' structure, for example, having nematic or cholesteric ordering, is obtained, as shown for example, in FIGS. 2A–3. The invention includes subtracting a constituent from a structure that includes a liquid crystal, to form a 'mold' (or polymer matrix if a polymer is used as the remaining component) on a molecular level. By adding and/or subtracting materials to or from the mold, a liquid crystal-like structure may be obtained. This resulting structure is fabricated entirely, or at least partially, from non-LC material, while exhibiting some LC characteristics. The liquid crystal-like structure overcomes the drawbacks of LCs and may have some other advantageous properties.

As used herein, the term 'liquid crystal' or 'LC', means the class of materials in which a liquid-like order exists in at least one direction of space and in which some degree of anisotropy is present, as defined by DeGennes and Prost in *The Physics of Liquid Crystals*, (2nd ed., pp. 1–3, Clarendon Press, 1993. Similarly, the term 'non-liquid crystal' or 'non-LC' as used herein, refers to substantially any material including monomers and/or polymers, which are not liquid crystals as defined herein. Suitable non-LC materials include substantially any materials capable of filling the voids as described herein. The non-LC material may be an organic or inorganic gas, liquid, a solution of small particles in a liquid or solid (after polymerization or other freezing. Examples of suitable non-LC materials include thermally or radiatively curable epoxies and acrylates. The term 'liquid crystal-like molecular ordering' and/or the term 'liquid crystalline molecular ordering' is defined herein as the long range molecular order characteristic of liquid crystals, such as, for example, nematic, smectic, and columnar or cholesteric ordering.

Referring now to FIGS. 1–8, the present invention will be more thoroughly described. Turning to FIG. 1, a preferred embodiment of the fabrication process of the optical devices of the present invention is shown.

In Step 1, materials A and B are substantially uniformly mixed. The material A is a liquid crystal, which may be either polymerizable or non-polymerizable. The material A itself may be a mixture of several materials. The materials B is a liquid crystal or a non-liquid crystal, which may be either polymerizable or non-polymerizable. The material B itself may be a mixture of several materials. In the event polymerizable materials are utilized, materials capable of being polymerized in any convenient manner, such as photo and/or thermal-induced polymerization or other means, may be utilized. For a photo-polymerizable material, a small amount of photo-initiator may be added to the blend. Typically, its concentration is a few percentage by weight. However, high photo-initiator concentrations may also be utilized. Materials A and B are 'nonreactive.' As used herein, the term 'non-reactive' has the same meaning as used by R. A. M Hikmet and B. H. Zwerver, in 'Cholesteric gels formed by LC molecules and their use in optical storage,' *Liquid Crystals*, 13, 561(1993), (the Hikmet/Zwerver paper) and others: no chemical reaction between the materials to form a different material.

Films with blend A +B

In Step 2, an optical film is prepared with the blend, using well-known techniques for liquid crystals. The film is 'aligned' in the sense that the molecules of the blend are long-range ordered and the film exhibits its characteristic optical properties, for example, wavelength- and circular polarization-selective reflectance for cholesteric liquid crystal (CLC) films, and phase-shift for nematic liquid crystal (NLC) films. FIG. 2A illustrates schematically the ordering for a nematic liquid crystal film consisting of materials A and B, whose elongated molecules are represented by ellipsoids of two sizes, 2A2 for material A and 2A3 for material B. The film is disposed on a substrate 2A1. For an aligned nematic film, the long axes of molecules are ordered more-or-less in parallel, resulting in a film that is optically birefringent. The refractive indices, taken along and perpendicular to the averaged direction of the molecular long axes, or the molecular director, are represented by $n_e$ and $n_o$, respectively. The optical birefringence $\Delta n = n_e - n_o$. For rod-shaped LC molecules, $n_e > n_o$ and the birefringence is termed 'positive.' For disc-shaped LC molecules, $n_e < n_o$ and the birefringence is termed 'negative.' The average index of refraction $n_{av} = (n_e + n_o)/2$.

The film prepared with aligned cholesteric liquid crystal has wavelength—and circular polarization-selective reflectance. The reflectance band is centered at $\lambda_c = n_{av} P_O$ and a bandwidth $\Delta\lambda/\lambda_c = \Delta n/n_{av}$, where $P_O$ is the helical pitch. Various novel phase retardation devices and others utilizing 'CLC-like' films obtained using process described below will be disclosed.

If at least one material of the blend (either material A or material B) is polymerizable, it may be advantageous to 'freeze' the molecular ordering by polymerization. Depending on the blending of materials A and B and conditions of polymerization process, the 'ordering' may be changed. For example, as disclosed by L. Li and S. M. Faris, 'Single-layer reflective super broadband circular polarizer and method of fabrication therefor,' U.S. Pat. No. 5,691,789 November 1997, (the Li/Faris patent) the reflectance band after polymerization may exhibit a significantly increased bandwidth over the reflectance band before the polymerization. This is attributed to a local compositional non-uniformity (in terms of relative concentration of materials A and B) across the film thickness direction that results in a continuously varied pitch formed during polymerization.

Although polymerization is a convenient method for 'freezing' the molecular ordering, various alternative techniques for freezing may be utilized. This freezing of the liquid crystal ordering may be achieved by changing the film temperature. For example, a film may be prepared with a blend consisting of materials A and B at a predetermined temperature. Additional film processing steps may be performed at a lower or higher temperature at which the ordered liquid crystal structure is maintained by one of the components, i.e., material A.

Process for (A+B)−B=A

In Step 3, the material B is removed, either partially or completely, from the film by some means, for example, dissolving with a suitable solvent or vaporizing with heat or evaporation under vacuum. The sites occupied by the removed material become vacant. These voids are elongated in shape, not necessarily uniform in size but are spatially ordered in a certain manner. For a nematic film, the voids are arranged such that the average direction of their long axes point parallel to the film plane (i.e., substantially parallel to the substrate surface plane) and perpendicular to the direction across the film (i.e., substantially perpendicular to the direction normal to the substrate).

FIG. 2B shows schematically the same cross-sectional view of the structure for the film shown in FIG. 2A, after the material B is selectively removed, leaving only material A, with some residual material B (not shown). The film is on a substrate 2B1. One of the sites vacated by the material B is represented by dashed lines at 20. The distribution or 'density' of the sites or voids 20 is proportional to the local density of the material B (in FIG. 2A). The voids 20 are relatively small and they are expected to be of microscopic scale ($\frac{1}{30}$ wavelength of incident light or smaller) and are connected to one another.

For a CLC film, the voids are arranged such that the average direction of their long axes in a film plane parallel to the substrate plane traces in a helical fashion across the film direction (normal to the substrate surface). After removal of the material B, the average index of refraction is smaller due to the presence of voids or empty sites 20. Other optical characteristics of the resulting film are also modified. For example, the wavelength- and circular-polarization-selective reflectance band is shifted to a shorter wavelength, and bandwidth is reduced for CLC films. The phase-shift $\Delta\phi$, that is equal to $\Delta nL$, where L is the thickness of the film, is reduced for nematic films.

Process for [(A +B)−B]+C =A +C

Step 4, may be optionally used to engineer desired properties, such as a particular operating temperature range, improved mechanical and/or chemical stability, etc., into the film structure. This step involves introducing a material C into the voids 20 of the film. This material C may be a liquid crystal or a non-liquid crystal that may be either polymerizable or non-polymerizable. Furthermore, the non-LC material C may be optically isotropic. The material C may be an organic or inorganic gas, liquid or solid, and it itself may be a mixture of several materials. For some applications, the material C may be the component B, minus some of its constituents. Typically, the component C is of low viscosity to facilitate its infiltration into the voids by capillary action. Placing the film with its surface coated with the component C in a vacuum chamber substantially increases the filling speed, as the air in the voids 20 is evacuated. If the material C is polymerizable, either by light, heat or other means, the film is polymerized to freeze the molecular ordering. The resulting film consists of the original material A and the added material C, and possibly material B (either as a residue, due to incomplete removal or deliberately introduced as a component of C). The optical characteristics of the resulting films are again modified. For example, the wavelength- and circular-polarization-selective reflectance band is shifted to a longer wavelength and bandwidth is modified (either broadened or narrowed) for CLC films, the phase-shift is modified (increased or reduced) for nematic films, depending on the material C.

Process for {[(A +B)−B]+C}−A =C

Step 5, is an additional optional step that may be used to further engineer desired properties, such as operating temperature range, and/or improved mechanical and/or chemical stability, etc., into the film structure. In this step, the material A is removed, either partially or completely, from the film by some means, for example, by selectively dissolving with a suitable solvent or etching with a suitable etchant. The sites occupied by the removed material A become vacant. These voids are elongated in shape, not necessarily uniform in size but are spatially ordered in a certain manner. For a CLC film, the voids are arranged such that the average direction of their long axes in the particular film plane (parallel to the substrate) traces in a helical fashion across the film direction (normal to the substrate surface). For a nematic film, the voids are arranged such that the average direction of their long axes in the particular film plane (parallel to the substrate surface) points in one direction across the film direction (normal to the substrate). The distribution or 'density' of the voids is proportional to the local density of the material A prior to removal. Notably, the resulting film is substantially of material C, which may be a non-liquid crystal but retains a liquid crystal-like structure that exhibits characteristic optical properties, for example, the wavelength- and circular-polarization- selective reflectance band for films initially having the so-called CLC ordering and the phase-shift for films initially having a nematic ordering. The resulting film thus may provide the desirable optical characteristics of CL films, without the disadvantages associated with LC's such as temperature sensitivity, etc.

Alternate process (A +C)−A =C

Those skilled in the art will recognize that, a liquid crystal-like film of a non-liquid crystal material C may be obtained by first preparing a film with some materials A and C, then removing the material A from the film. For the purposes of step 5 above, it is assumed that an aligned liquid crystal film cannot be readily prepared directly from a blend of the particular materials A and C chosen.

Process for !{[(A +B)−B]+C}−A!+D =C+D

Step 6, is a still further optional step that may be used to further engineer desired properties, such as operating temperature range, and/or improved mechanical and/or chemical stability, etc., into the film structure. In this step, a material D is introduced in the voids of the film after the material A is removed. The component D may be a liquid crystal or a non-liquid crystal that may be either polymerizable or non-polymerizable. The material D may be a gas, liquid or solid and it itself may be a mixture of several materials. Typically, the component D is of low viscosity to facilitate its infiltration or permeation into the voids by capillary action. Placing the film with its surface coated with the component D in a vacuum chamber substantially increases the filling speed, as the air in the voids is evacuated. If the material D is polymerizable, either by light, heat or other means, the film is polymerized to 'freeze' the film structure. The resulting film consists of the materials C and D that may be either a liquid crystal or non-liquid crystal. The optical characteristics of the resulting film are again modified, for example, the center wavelength and the bandwidth of the wavelength- and circular-polarization-selective reflectance band is modified in the case of CLC-like films and birefringence is modified in the case of for nematic-like films.

Alternate process $[(A+C+D)-A]+C=C+D$

Those skilled in the art will recognize that, a liquid crystal-like film of materials C and D may be obtained by first preparing a film with materials A, C and D, then removing the material A from the film and filling the voids with C or D. For illustrative purposes, it is assumed that an aligned liquid crystal film cannot be readily prepared directly from a blend of materials C and D.

Illustrative Examples

EXAMPLE I

Figure 4A:
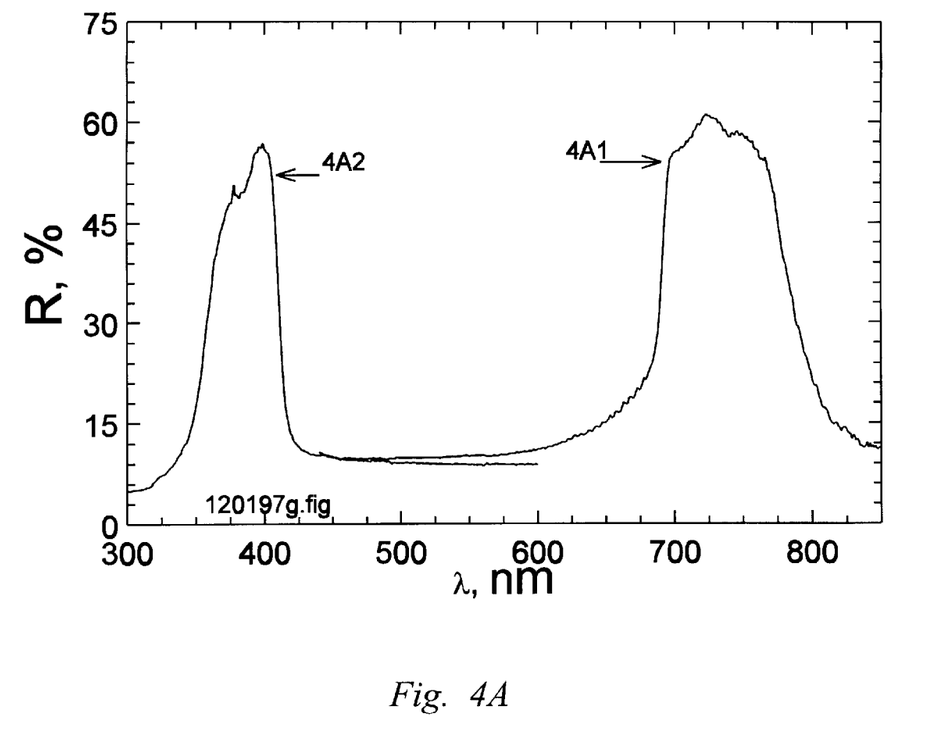
FIG. 4A shows experimental reflectance spectra of an illustrative CLC film sample, according to the inventive process.

FIG. 4A shows experimental reflectance spectra of film samples that were prepared in accordance of the invented process. Curve 4A1 is the reflectance spectrum of a planar CLC film of a blend consisting of a BASF acrylate CLC polymer #181 (45% by weight), a chiral nematic (53% by weight) and a small amount of Ciba-Geigy photo-initiator Irgacure 184 (2% by weight). The chiral nematic itself consisted of Merck low-molecular-weight nematic liquid crystal E44 and chiral dopant R1011 (0.7% by weight with respect to the chiral nematic). The film was 20 μm thick and was prepared in a conventional manner, i.e., two glass substrates were first spin-coated with a thin polyimide alignment layer which are mechanically rubbed. Glass beads of 20 μm in diameter were then dispersed between the two glass substrates, with the coated sides facing each other. The CLC blend was then introduced between the substrates by capillary action. After mechanically shearing (relatively small sideways motions of the substrates to force the LC molecules to align), the film was annealed at room temperature for 30 minutes (a process of letting the sample sit undisturbed and letting the intrinsic molecular force further align the molecules). The film was then photo-polymerized with an UV lamp. One of the substrates was removed. The reflectance 4A1 was taken from the 'naked' film side (the side without the glass substrate). In the context of foregoing discussion, material A was the BASF 181 polymer and material B was the low-molecular chiral nematic. A film with the blend (A +B) was thus prepared. The B-component (the low-molecular-weight chiral nematic) was subsequently removed by dissolving with acetone, resulting in a CLC-like film with material component A only. It is interesting to note that by re-introducing the component B (the chiral nematic Merck E44 and R1011) the reflectance spectrum was nearly identical to that of the original film. This indicates that the chiral nematic 're-occupies' the voids, making it nominally identical to the original. It demonstrates that material B refills the voids. The film had helically ordered voids that were occupied by the component B. Curve 4A2 shows the reflectance spectrum with introduction of an UV curable epoxy (Norland Products, Inc., Part No. 6101) to the voided film.

EXAMPLE II

Figure 4B:
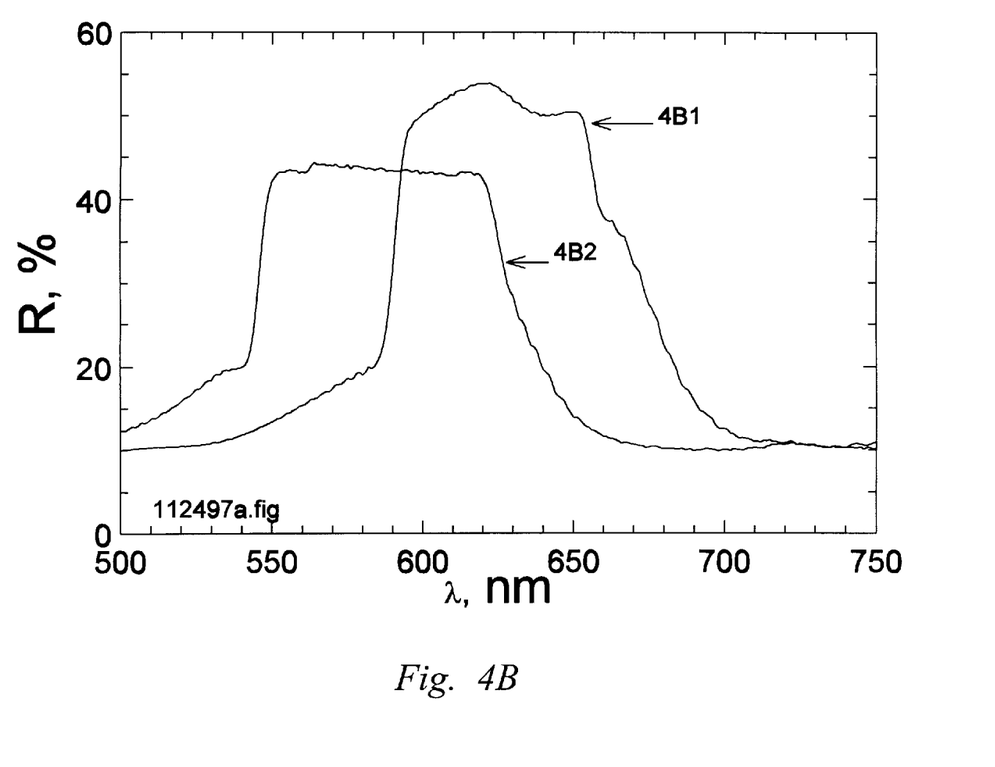
FIG. 4B shows experimental reflectance spectra of another illustrative CLC film sample, according to the inventive process.

FIG. 4B shows experimental reflectance spectra of film samples that were prepared in accordance with the invented process. Curve 4B1 was the spectrum of a planar CLC film of the blend consisting of a BASF acrylate CLC polymer #181 (26% by weight), a chiral nematic (69% by weight) and a small amount of Ciba-Geigy photo-initiator Irgacure 184 (5% by weight). The chiral nematic itself consisted of Merck low-molecular-weight nematic liquid crystal E44 and chiral dopant CB15 (24.4% by weight with respect to the chiral nematic). The film was 20 μm thick and was prepared in a similar manner described above with respect to Example I. After the film sample was photo-polymerized with a UV lamp and one of the substrates was removed, the reflectance 4A1 was taken from the 'naked' film side. In the context of foregoing discussion, A was the BASF 181 polymer, B was the low-molecular chiral nematic. A film with the blend (A +B) was prepared. The B-component (the low-molecular-weight chiral nematic) was subsequently removed by dissolving with acetone, resulting in a CLC-like film with material component A only. The film had helically ordered voids that were occupied by the component B. It is interesting to note that by re-introducing the component B (chiral nematic Merck E44 and CB15) the reflectance spectrum (not shown) was nearly identical to that of the original film. Curve 4B2 shows the reflectance spectrum with introduction of Merck E44 alone to the voided film. The reflectance spectrum was different from the original reflectance spectrum. This difference may be attributed to the difference in birefringence and in average index of refraction $n_{av}$ of the voids originally occupied by CB15 which are subsequently filled with E44.

EXAMPLE III

Figure 4C:
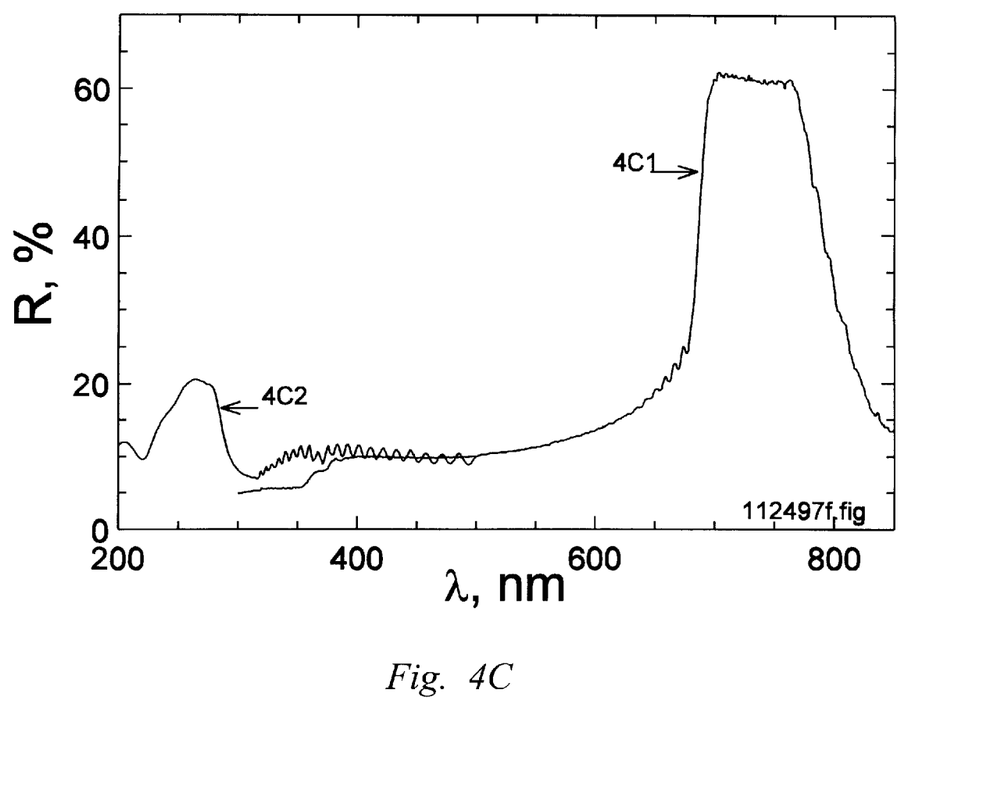
FIG. 4C shows experimental reflectance spectra of a third illustrative CLC film sample, according to the inventive process.

FIG. 4C shows experimental reflectance spectra of film samples prepared in accordance with the invented process. Curve 4C1 is the reflectance spectrum of a planar CLC film of the blend consisting of a BASF acrylate CLC polymer #181 (45% by weight), a chiral nematic (53% by weight) and a small amount of Ciba-Geigy photo-initiator Irgacure 184 (2% by weight). The chiral nematic itself consisted of Merck low-molecular-weight nematic liquid crystal E44 and chiral dopant R1011 (0.7% by weight). The film was 20 μm thick and was prepared in a similar manner described above. After the film sample was photo-polymerized with an UV lamp and one of the substrates was removed, the reflectance 4A1 was taken from the 'naked' film side. In the context of foregoing discussion, A was the BASF 181 polymer, B was the low-molecular chiral nematic. A film with the blend (A +B) was prepared. The B-component (the low-molecular-weight chiral nematic) was subsequently removed by dissolving with acetone, resulting in a CLC-like film with material component A only with the reflectance spectrum shown as curve 4C2. It is noted that center wavelength of the reflectance band was shifted from about 734 nm to about 265 nm. The reflectance of the processed film was reduced, due to material absorption in the UV spectral region.

Spatially Featured Phase-Retardation Devices

The aligned nematic film of the present invention may be used as a phase-retardation device. For a film with a birefringence Δn and thickness L, the phase retardation for light having a wavelength λ is given by $\Delta\phi=\Delta nL/\lambda$ and is typically expressed in units of 2π. An example is a quarter-wavelength retardation device, with $\Delta\phi=(2N+\frac{1}{4})\pi$ where N is an integer. The quarter-wavelength retardation device is an optical device that changes a circularly polarized incident light into linearly polarized light after traversing the film and vice versa, in which a linearly polarized incident light is changed into circularly polarized after traversing. The phase retardation Δφ is strongly dependent on the wavelength λ, of incident light, so that a quarter-wavelength device 'perfectly' or optimally designed for $\lambda_1$ is not a 'perfect' quarter-wavelength device for $\lambda_2$. In such an instance, the light $\lambda_2$ transmitted from a quarter-wavelength device designed for $\lambda_1$ is elliptically polarized, instead linearly or circularly polarized. In other words, circularly polarized incident light of wavelengths $\lambda_1$ and $\lambda_2 \neq \lambda_1$ cannot be simultaneously transformed into linearly polarized light. Similarly, linearly polarized incident light of wavelengths $\lambda_1$ and $\lambda_2 \neq \lambda_1$ cannot be simultaneously transformed into circularly polarized light. The problem becomes more acute if the incident light is of broad band. A zero-order retardation device (N =O, where N is defined earlier for the quarter-wave device) is preferred over high N-order devices, but the former is typically more expensive. There are known means to 'achromatize' or substantially eliminate wavelength-dependence over a given range or a set of discrete wavelengths for the wave retardation devices, such as quarter-wavelength plates. However, these devices are typically complex, and for example, tend to require several birefringent layers in a stack.

Figure 5A:
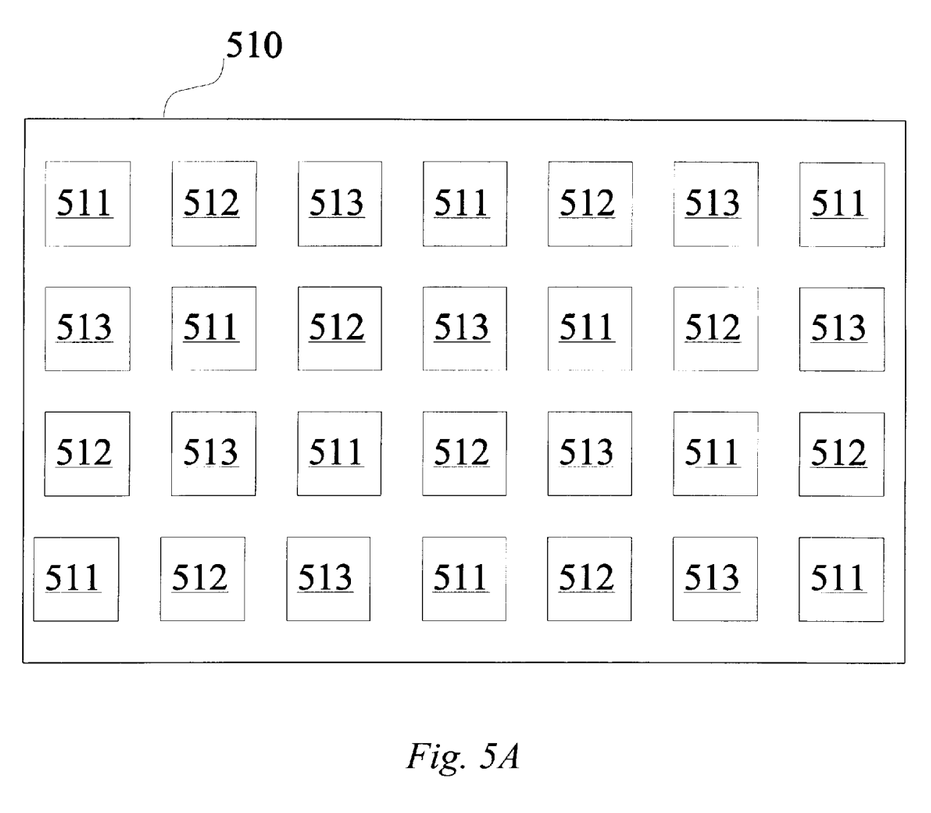
FIG. 5A shows a nematic-like film with phase retardation varied over zones fabricated with the present invention.

For some applications, such as for example, a color display utilizing a CLC filter, a display may be divided into spatial regions, for which the phase retardation film of the present invention is optimized to a particular spectral band. FIG. 5A illustrates such an optical device 510 having plural zones in a 'checker board' fashion, having zones 511 for red-color subpixels, zones 512 for green-color subpixels, and zones 513 for blue-color subpixels. Using the process disclosed hereinabove, a pixeled wave retardation film may be easily fabricated for a spectral band between $\lambda_1$ and $\lambda_2$, with a birefringence of $\Delta n$, by adding an appropriate material C for a subpixel such that, $\Delta nL/\lambda_{12} = \pi/4$, where $1/\lambda_{12} = (1/\lambda_1 + 1/\lambda_2)/2$, assuming intensity distribution is uniform over the spectral band. For example, the visible range (400–700 nm) may be divided into three so-called primary color bands: red (R) (607–700 nm), green (G) (510–607 nm) and blue (B) (400–510 nm) for RGB color subpixels. The $\lambda_{12}$'s are 650, 554 and 448 nm, respectively, for the red, green and blue bands. For non-uniformly distributed spectral bands which are typically generated from a discharge lamp for an LCD display, $\lambda_{12}$'s may be chosen, for example, to be the mean value over the band weighted by lamp intensity-dependent distribution.

Spatially Featured Notch Filter Devices

Figure 5B:
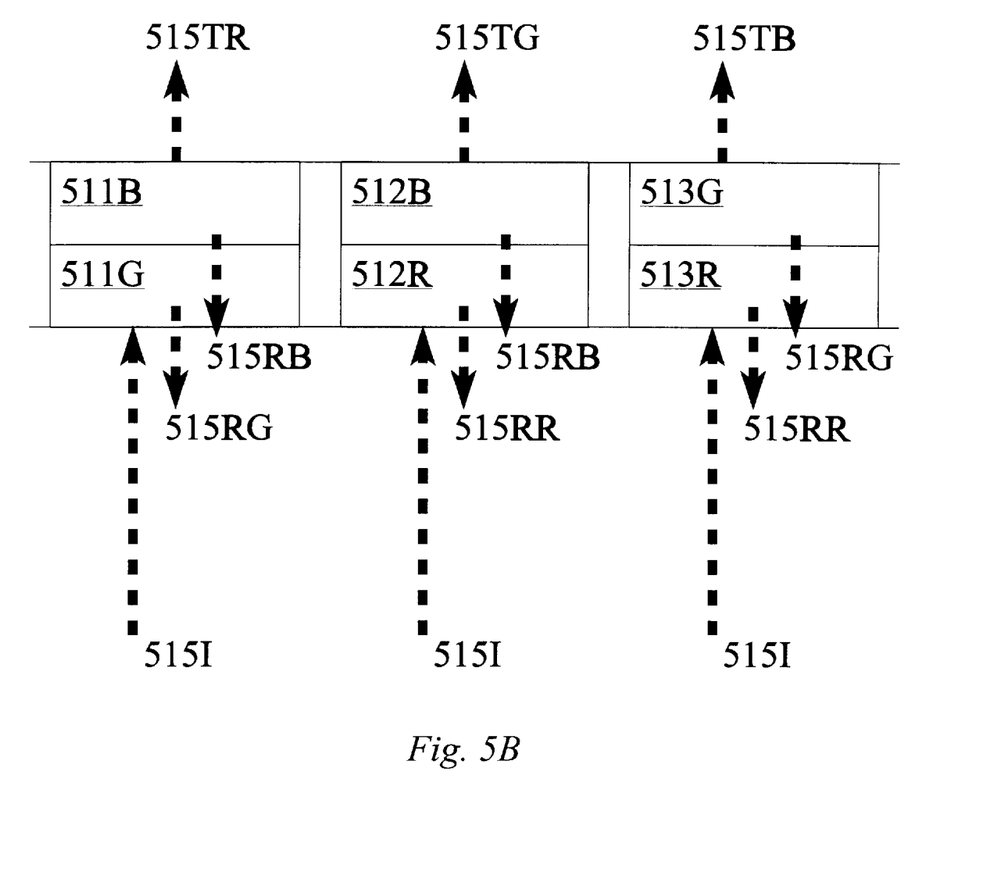
FIG. 5B is a cross-sectional view of a pixeled RGB color filter fabricated in accordance with the present invention.

The planar cholesteric film of the present invention may be used as a spatially featured notch or rejection filter device. By selectively reflecting a spectral component of the incident light beam, the filter has a rejection band centered at $\lambda_c = n_{av}P_O$ and a bandwidth $\Delta\lambda = \lambda_c(\Delta n/n_{av})$ and the circular polarization of the like-handedness of the film. For some applications, such as for example, a color display utilizing a CLC color filter, such a filter device has advantages over conventional absorptive color filter film used for liquid crystal displays, such as disclosed in Japanese reference No. 9-318807. In this example, the color filter film is divided into spatial regions, for which the filter of the present invention is optimized to a particular spectral band. It is more convenient to describe the rejection filter as a pass filter. For the visible incident light, it is convenient to divide the filter into three so-called primary color bands: a red-passing filter rejects the green and blue spectral components, a green-passing filter rejects the red and blue spectral components and a blue-passing filter rejects the red and green spectral components. Using FIG. 5A as an illustration, the optical device 510 may have plural zones in a 'checker board' fashion, having zones 511 of a red-passing filter, zones 512 of green-passing filter, and zones 513 of a blue-passing filter. The neighboring red, green and blue-passing filters constituting a pixel. Using the process disclosed hereinabove, a pixeled color filter film may be easily fabricated for primary colors, by adding an appropriate material C for a subpixel such that the red-passing filter has two subregions, one rejecting the green spectral component and the other rejecting the blue spectral component. FIG. 5B shows a cross-sectional view of the pixeled RGB color filter. The red-passing subpixel filter includes two sublayers 511G and 511B, rejects the green and blue spectral components 515RG and 515RB, respectively, of the incident 'white' circularly polarized light 515I. The transmitted light is circularly polarized red component 515TR. Similarly, the green-passing subpixel filters includes two sublayers 512R and 512B, and rejects the red and blue spectral components 515RR and 515RB, respectively, of the incident 'white' circularly polarized light 515I. The transmitted light is circularly polarized red component 515TG. The blue-passing subpixel filters consists of two sublayers 513R and 513G, rejects the red and green spectral components 515RR and 515RG, respectively, of the incident 'white' circularly polarized light 515I. The transmitted light is circularly polarized red component 515TB.

For those skilled in the art, variations of this filter structure may be implemented to achieve the same effect. For example, the red-passing filter may be a single layer (i.e., no sublayers), if its rejection band is broad enough to cover both the green and blue. In another example, instead of adding a different material C to opposite sides of the film, the filter may be fabricated as two distinct layers laminated together, each layer having subpixeled R-, G-, and B-rejection bands.

Dichroic Polarizers

Figure 6:
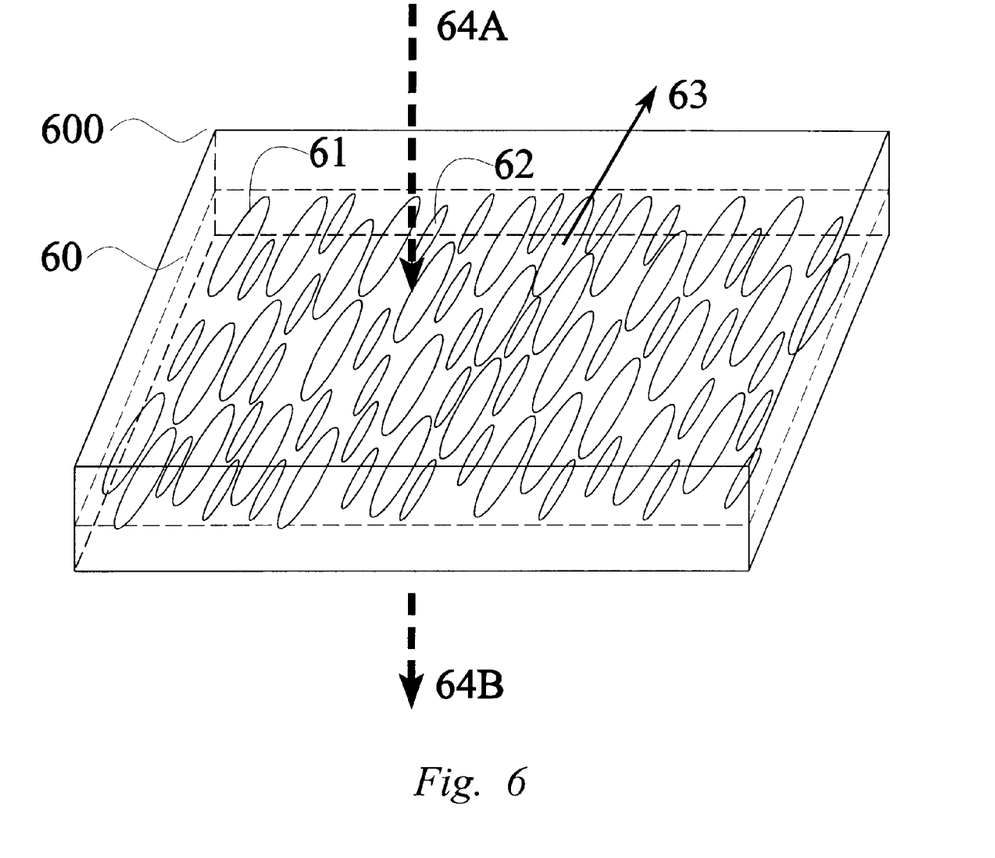
FIG. 6 shows a nematic-like film as an absorptive linear polarizer fabricated with the present invention.

The processes of the present invention may be utilized to fabricate dichroic polarizers using a nematic LC as the material A. It is known that films with aligned nematic LC doped with dichroic dyes may be used for an absorptive polarizer, due to its ability to absorb more strongly incident light of a particular polarization than the other, since the dye molecules are aligned in the film. Referring to FIGS. 2C, 2D and 2E, one of the added materials C and/or D (for example, material C indicated by 2C3 in FIG. 2C, material C indicated by 2D2 in FIG. 2D, material C indicated by 2E2 and material D indicated by 2E3 in FIG. 2E,) is optically absorptive. Since this material fills the sites (voids) vacated by the removed LC, the molecules of the material collect in elongated aggregations which simulate elongated LC molecules. In this manner, the added material C and/or is provided with LC-like molecular ordering. These aggregations thus exhibit optical characteristics similar to LC molecules, i.e., they absorb incident light of a particular polarization more strongly than the other, whereby the transmitted light has only one dominant polarization. The present approach is advantageous, as the inherent constraints with organic dichroic materials may be removed to result in a high-performance polarizer devices. For example, materials C and D may be chosen for their 'light fastness' (resistance to bleaching/decomposition as dichroic dyes do), broadband (a blend of absorptive materials showing a composite broadband absorption), wide spectral range (more absorptive materials over UV to IR spectral range are available, compared to special dichroic organic dyes) and high operating temperatures. FIG. 6 illustrates a dichroic polarizer 601, with a sectional view 501 showing the structure that includes material A 61 and material C 62. The director 63 is represented by an arrow. The incident light 64A is unpolarized and transmitted light 64B is substantially polarized perpendicular to the director, as the light component polarized in parallel to the director is substantially absorbed by material C.

Broadband Circular Polarizers

A single layer broadband circular polarizer may be obtained with certain cholesteric liquid crystal blends and polymerization, in the manner set forth in the above-referenced Li/Faris patent. Briefly described, such a polarizer may be fabricated with a CLC blend which includes a polymerizable CLC monomer and a non-reactive nematic liquid crystal or chiral nematic liquid crystal (a nematic liquid crystal with chiral dopant). The nematic liquid crystal or chiral nematic liquid crystal has limited temperature range as a liquid crystal phase. Thus, such a polarizer has a limited operating temperature range. Its upper limit is typically set by the nematic liquid crystal or chiral nematic liquid crystal (about 100° C.) rather than by the polymer matrix itself (about 200° C.). Furthermore, these nematic liquid crystal or chiral nematic liquid crystals are typically thermotropic, that is, the optical properties are strongly dependent on temperature. Thus, the characteristics of a polarizer using such a blend are relatively temperature sensitive. Using the process of the present invention, such drawbacks may be overcome. In one example, a polymerizable CLC monomer may be utilized as the material A and a non-reactive nematic liquid crystal or chiral nematic liquid crystal as the material B. After an aligned CLC film is prepared and polymerized, the material B is removed from the film. Symbolically, $(A+B) -B =A$. The resulting film is fully polymeric which is CLC-like, that is, exhibits wavelength- and circular polarization-selective reflectance. The optical properties of the film are temperature-insensitive over a relatively large temperature range, particularly near the high limit. A further advantage of this process is that the removed material B may be recycled for subsequent use. This is particularly advantageous in the event a desired material B is available only from a limited number of suppliers and is thus relatively scarce and/or expensive.

Typically, the reflectance band of the resulting films are observed to have a narrower bandwidth and a shorter center wavelength than conventional devices. It also may be understood from the aforementioned relations $\lambda_c =n_{av}P_O$ and $\Delta\lambda/\lambda_c =\Delta n/n_{av}$, and from the definition of $n_{av}$ that the resulting films have a smaller $n_{av}$ (because of the voids). In this regard, for a film having two materials 1 and 2, the average refractive index is an average of the $n_{av}$ of each of the individual materials. Thus, for such a film, $n_{av}=c_1 n_{av1} +c_2 n_{av2}$ where $c_1$ and $c_2$ are weighted coefficients that are functions of the relative fractions of materials 1 and 2 and possibly of other material parameters. (The variables $n_{av1}$ and $n_{av2}$ are equal to $(n_e +n_o)/2$ for each of the materials 1 and 2, respectively, as discussed hereinabove.) If material 2 is replaced by voids, then the weighted average will be smaller, as voids (air) has a refractive index of 1 (which is a minimum).

The resulting film also has a smaller $\Delta n$ (due to the nulled contribution from material B after removal) and possibly smaller $P_O$ (due to film thickness shrinkage). Thus, for a circular polarizer with an engineered reflectance band, a film with a broader bandwidth and a longer center wavelength is first prepared. Those skilled in art will recognize that particular materials and their percent concentrations may be selected to optimize the LC blend for a desired reflectance band. The particular process steps used may also be selected, i.e., one or more of optional process steps 4–6 may be utilized, to obtain desired properties. For example, by filling voids with material C, a 'dense' (that is, no voids) film may be obtained. Such films may have some advantages, such as being more mechanically stable (due to increased rigidity), and more resistant to moisture (due to less surface area), etc.

Tunable Notch Filters

CLC-like films obtained in accordance with the present invention by symbolically $(A+B)-B =A$, where A is a resilient material, contain voids and are therefore mechanically compliant in the sense that when a pressure is applied on the surface on the film, the material compresses, so that the helical pitch (and possibly the average refractive index) is mechanically changed, thereby also changing the center wavelength of the reflectance band.

Figure 7:
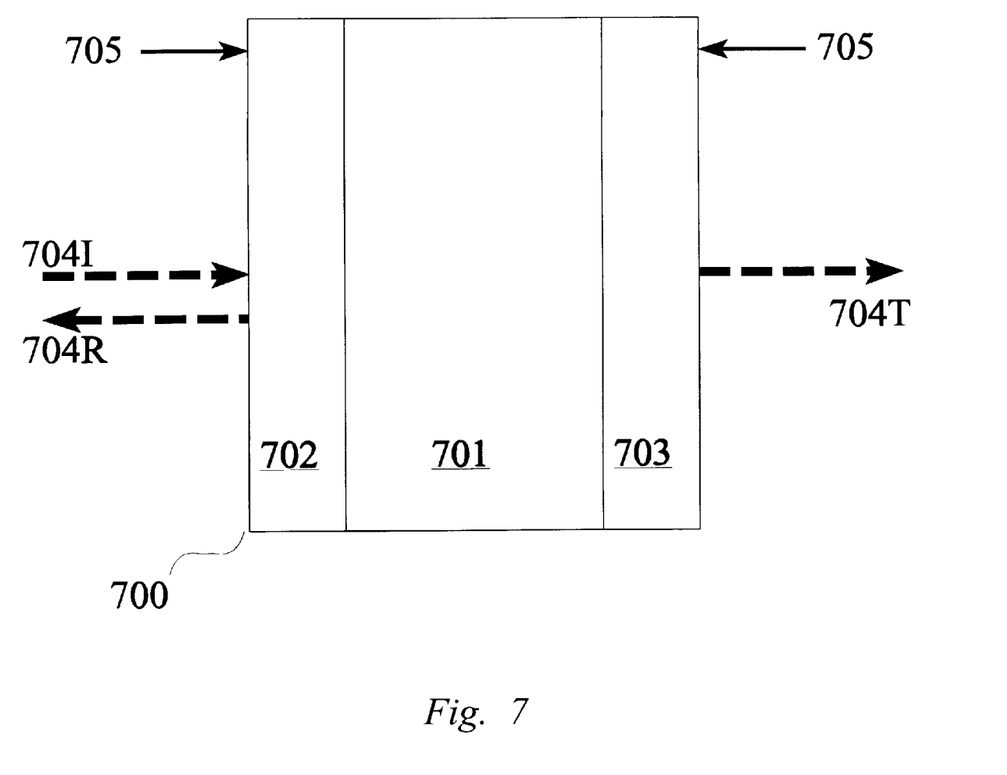
FIG. 7 illustrates a preferred embodiment of tunable notch filter fabricated with present invention.

Using this effect, the CLC-like films may be utilized as tunable notch filters. FIG. 7 illustrates a preferred embodiment of a tunable notch filter, using the structure fabricated by the CLC-like film processing of the invention. The notch filter 700 consists of a CLC-like film 701 sandwiched between two substrates 702 and 703. The substrates are provided for convenience to transmit pressure represented by arrows 705 on the CLC-like film. A circularly polarized light beam 704I is incident on the film. If the wavelength of the incident beam is within the reflectance band, the incident light is substantially reflected. The reflected beams is indicated by 704R. If the wavelength of the incident beam is outside the reflectance band, the incident light is substantially transmitted. The transmitted beam is indicated by 704T. (It is assumed the handedness of the CLC-like film is the same as the circular polarized state of the incident beam.) By applying a pressure on the film, the pitch changes and the reflectance band shifts and narrows. Thus, the transmission of the incident light (either transmitted or reflected) by the device may be controlled. Moreover, such tunable notch filters may also be used as pressure sensors. For example, shifts in the reflectance band of the filter may be used to determine changes in pressure being applied to the filter. It should be clear to one skilled in the art that stacking left-handed and right-handed CLC-like films with similar reflectance bands may form a switchable mirror that reflects or transmits unpolarized light.

Figure 8:
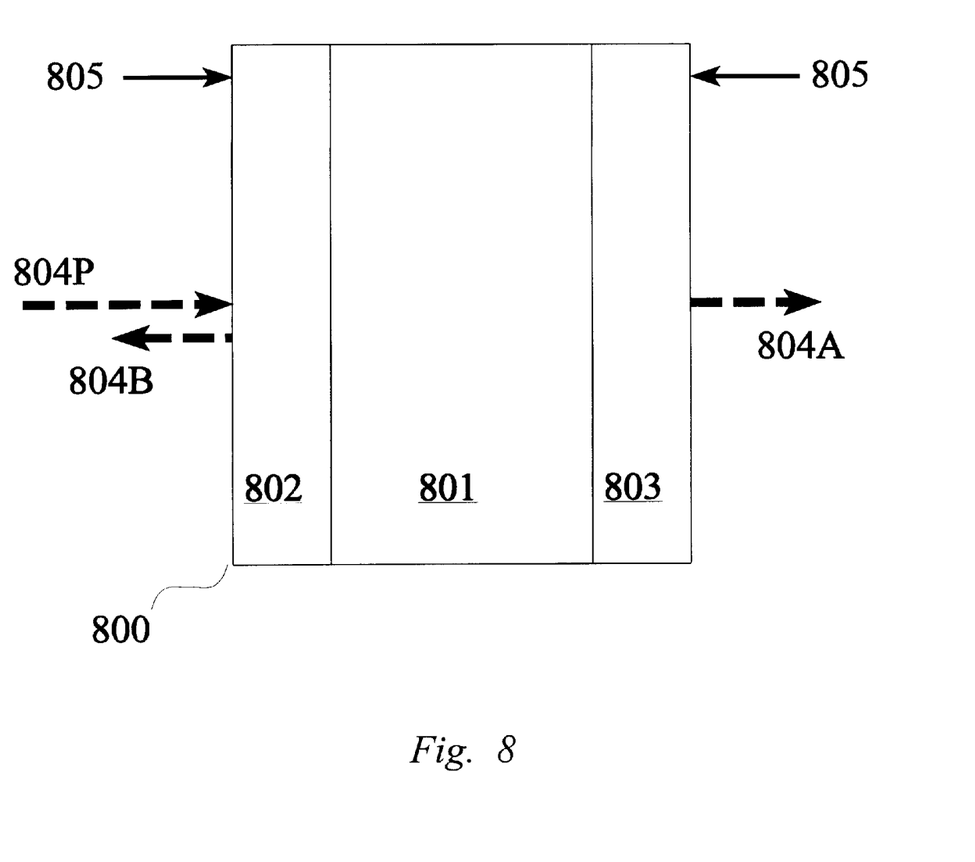
FIG. 8 illustrates a preferred embodiment of tunable dye laser fabricated with present invention.

If the CLC-like film is doped with laser dyes, in the manner discussed in our commonly assigned U.S. Patent application Ser. No. 09/045,307, entitled "Solid State Dye Laser", the output wavelength of stimulated laser emission may be tuned. FIG. 8 illustrates a preferred embodiment of a tunable dye laser, using the structure fabricated by the CLC-like film processing of the present invention. The dye laser 800 consists of the dye-doped gain medium 801 sandwiched between two substrates 802 and 803. The substrates are provided for convenience to transmit pressure represented by arrows 805 on the dye-doped CLC-like film. The pump beam 804P is incident on the film and the stimulated emission emits in two directions normal to the film surface, represent by 804A and 804B. By changing the pitch of film (via pressure), the edge of the reflectance band changes, to change the output wavelength of the dye laser. Moreover, in addition to use as a tunable light source, this device also may be used as a pressure sensor. For instance, the output wavelength of the laser emission may be monitored to indicate the pressure applied to the device in a manner similar to the tunable notch filter described hereinabove. An added advantage of utilizing the tunable dye laser in this manner is that the monitored signal (the wavelength of the laser emission) is independent of the angle at which the pump beam is incident on the sensor. In the aforementioned example using the tunable notch filter without the laser dye, the reflectance band depends on the angle between the observer and film normal. A 'blue' shifting (a shorter center wavelength) is observed as the incidence angle increases.

Optical Storage Layers

It has been shown (i.e., in the Hikmet/Zwerver paper), that the shifting of the reflectance band, when a component of a CLC film is removed, may be used for optical data storage. Briefly, described, Hikmet and Zwerver utilize a chiral nematic material consisting of a polymerizable monomer nematic material and a non-reactive chiral dopant to prepare an aligned CLC film with a first center wavelength of a characteristic reflectance band. The chiral dopant is then locally removed by thermal evaporation at a high temperature (about 200° C.) using a focused laser beam, resulting in a reflectance band having a second center wavelength. The shifting in the reflectance band may thus be utilized to store digital data represented by binary states.

With CLC films prepared in accordance with the present invention, the data storage layers may have lower operating temperature and/or narrower reflectance bandwidth which results in more storage capacity when wavelength division multiplexing is used in a multilayer structure in the manner described in commonly assigned U.S. Pat. No. 5,353,247 to Faris entitled, "Optical Mass Storage System and Memory Cell Incorporated Therein" and U.S. Patent application, Ser. No. 08/539279 August 1995, by B. Fan and S. M. Faris, entitled "Multiple Layer Optical Recording Media and Method and System for Recording and Producing Information Using the Same" (as amended). Referring to the film process steps symbolically by [(A +B) −B]+C, the particular material C may be chosen to be relatively volatile (to lower evaporation temperature), to provide a narrower second reflectance bandwidth, and/or larger shift between the first and second center wavelengths (by changing Δn and/or $n_{av}$ after data recording). Those skilled in art will recognize that particular materials and their percent concentrations may be selected to optimize the LC blend for a desired reflectance band. The particular process steps used may also be selected, i.e., one or more of optical process steps 4–6 may be utilized, to obtain desired properties.

The foregoing description is intended primarily for purposes of illustration. Although the invention has been shown and described with respect to exemplary embodiments thereof, it should be understood by those skilled in the art that the foregoing and various other changes, omissions, and additions in the form and detail thereof may be made therein without departing from the spirit and scope of the invention.

What is claimed is:

1. An ordered optical film structure fabricated by the steps of:
   (a) providing a first material and a second material which are non-reactive relative to one another, at least one of said first material and said second material being a liquid crystal;
   (b) combining the first material with the second material to form a blend;
   (c) forming a film with the blend, the film having a molecular ordering defined by the liquid crystal;
   (d) freezing the molecular ordering of the film;
   (e) removing one of said first material and said second material to form a matrix having a plurality of sites interspersed therethrough and a liquid crystalline molecular ordering; and
   (f) introducing a third material to the plurality of sites.

2. The film structure of claim 1, wherein the matrix comprises a liquid crystal and has a liquid crystalline molecular ordering.

3. The film structure of claim 1, wherein the matrix comprises a non-liquid crystal and the plurality of sites has a liquid crystalline molecular ordering.

4. The film structure of claim 3, wherein the third material has a liquid crystalline molecular ordering.

5. The film structure of claim 1, wherein said freezing step (d) further comprises changing the temperature of the film.

6. The film structure of claim 1, wherein at least one of said first material and said second material is polymerizable and said freezing step (d) further comprises polymerizing the blend.

7. The film structure of claim 1, wherein the liquid crystal comprises a cholesteric liquid crystal and the film structure exhibits an ordering providing wavelength- and circular-polarization-selective reflectance and transmittance.

8. The film structure of claim 1, wherein the liquid crystal comprises a nematic liquid crystal and the film structure exhibits a long-range ordering providing phase-shift transmittance.

9. The film structure of claim 1, wherein the third material is frozen.

10. The film structure of claim 9, wherein the third material is polymerizable and is frozen by polymerization.

11. The film structure of claim 10, further comprising the step of (g) removing the one of said first material and said second material to provide a second series of sites interspersed within the film structure.

12. The film structure of claim 11, further comprising the step of (h) introducing a fourth material to the second series of sites interspersed within the film structure.

13. The film structure of claim 12, wherein the fourth material is a non-liquid crystal provided with a liquid crystalline molecular ordering.

14. The film structure of claim 1, wherein said liquid crystal is a nematic liquid crystal, and said third material is optically absorptive.

15. The film structure of claim 1, wherein said matrix further comprises a plurality of zones disposed in spaced relation along the film plane, at least two of said plurality of zones having discrete optical properties relative to one another.

16. The film structure of claim 15, wherein said plurality of zones comprise subpixels each having a discrete characteristic wavelength.

17. The film structure of claim 16, wherein said plurality of zones further comprise subpixels having blue, green and red characteristic wavelengths.

18. The film structure of claim 16, wherein said plurality of zones comprise subpixels each having a discrete characteristic polarization.

19. The film structure of claim 18, wherein said subpixels are adapted to reflect light within said characteristic wavelengths and polarization.

20. The film structure of claim 18, wherein said subpixels are adapted to transmit light within said characteristic wavelengths and polarization.

21. An ordered optical film structure comprising:
   a substrate;
   a material disposed on said substrate;
   said material being a non-liquid crystal having a liquid crystalline molecular ordering.

22. The ordered optical film structure of claim 21, wherein said liquid crystalline molecular ordering further comprises a cholesteric ordering providing wavelength- and circular-polarization-selective reflectance and transmittance.

23. The ordered optical film structure of claim 21, wherein said liquid crystalline molecular ordering further comprises a nematic ordering providing phase-shift transmittance.

24. The ordered optical film structure of claim 21, wherein said molecular ordering further comprises a plurality of sites disposed between molecules of said material.

25. The ordered optical film of claim 24, further comprising a second material disposed in said plurality of sites.

26. The ordered optical film of claim 25, wherein said second material is selected from the group consisting of nematic liquid crystals, cholesteric liquid crystals, non-liquid crystals, and combinations thereof.

27. An ordered optical film structure fabricated by the steps of:

(a) providing a liquid crystal and a non-liquid crystal which are non-reactive relative to one another;

(b) combining the liquid crystal with the non-liquid crystal to form a blend;

(c) forming a film with the blend, the film having a molecular ordering defined by the liquid crystal;

(d) freezing the molecular ordering of the film;

(e) removing one of said liquid crystal and said non-liquid crystal to form a matrix having a plurality of sites interspersed therethrough and having a liquid crystalline molecular ordering.

28. The film structure of claim 27, wherein said removing step (e) further comprises the step of removing the non-liquid crystal wherein the matrix comprises a liquid crystal and has a liquid crystalline molecular ordering.

29. The film structure of claim 27, wherein said removing step (e) further comprises the step of removing the liquid crystal wherein the plurality of sites has a liquid crystalline molecular ordering.

30. The film structure of claim 27, further comprising the step of (f) introducing a third material to the plurality of sites.

31. The film structure of claim 30, wherein the third material has a liquid crystalline molecular ordering.

32. The film structure of claim 27, wherein the matrix comprises a resilient material having a cholesteric ordering, the cholesteric ordering having a pitch which is selectively adjustable by compressing the resilient material against its bias, wherein the wavelength of a reflectance band of the film structure is changed.

33. The film structure of claim 32, wherein the matrix comprises a pressure sensor.

34. The film structure of claim 32, wherein the matrix is disposed between a pair of substrates.

35. The film structure of claim 32, further comprising the step of doping the matrix with at least one laser dye, wherein the film structure is adapted for emitting laser light at selectable wavelengths.

36. The film structure of claim 35, wherein the film structure is adapted for emitting laser light at said selectable wavelengths in response to a pump beam incident on said film structure.

37. The film structure of claim 36, wherein the film structure is adapted for emitting said laser light at said selectable wavelengths irrespective of an angle of incidence of the pump beam on said film structure.

* * * * *